United States Patent [19]
Battle et al.

[11] Patent Number: 5,779,398
[45] Date of Patent: *Jul. 14, 1998

[54] BATTERY-POWERED COOLING SYSTEM FOR TRAILOR PNEUMATIC UNLOADING PROCESS

[75] Inventors: Melton R. Battle, Charenton, La.; James E. Bedeker; Robert C. Heiss, both of Ottawa, Ill.

[73] Assignee: Bulk Transportation Services, Inc., Charenton, La.

[*] Notice: The term of this patent shall not extend beyond the expiration date of Pat. No. 5,580,193.

[21] Appl. No.: 681,457

[22] Filed: Jul. 22, 1996

Related U.S. Application Data

[63] Continuation of Ser. No. 534,286, Sep. 27, 1995, Pat. No. 5,580,193.

[51] Int. Cl.[6] .................................................. B65G 53/34
[52] U.S. Cl. ........................ 406/41; 406/108; 406/119; 406/122; 406/146; 406/198; 417/243
[58] Field of Search .................................. 406/39, 41, 108, 406/118, 119, 120, 122, 146, 197, 198; 417/231, 243

[56] References Cited

U.S. PATENT DOCUMENTS

| | | | |
|---|---|---|---|
| 4,512,687 | 4/1985 | Enns | 406/41 |
| 4,699,210 | 10/1987 | Brännström | 165/120 |
| 4,758,119 | 7/1988 | Frase et al. | 406/109 |
| 4,784,533 | 11/1988 | Teigen | 406/14 |
| 4,812,086 | 3/1989 | Kopernicky | 406/153 |
| 4,884,923 | 12/1989 | Wellink | 406/41 |
| 5,156,498 | 10/1992 | Nomura et al. | 406/48 |
| 5,209,608 | 5/1993 | Edwards | 406/100 |
| 5,248,227 | 9/1993 | Hidock et al. | 406/41 |
| 5,284,202 | 2/1994 | Dickey et al. | 165/299 |
| 5,354,152 | 10/1994 | Reinhardt et al. | 406/3 |
| 5,577,888 | 11/1996 | Capdevila et al. | 415/210.1 |
| 5,580,193 | 12/1996 | Battle et al. | 406/41 |

*Primary Examiner*—Andrew C. Pike
*Attorney, Agent, or Firm*—Haynes and Boone, L.L.P.

[57] ABSTRACT

Method and system unloads dry bulk materials from a tank hopper supported on a trailer, the trailer being connected to a tractor. A material conveying conduit is adapted for receiving material from the hopper. A blower is provided for supplying pressurized air to the hopper and to the conduit so that a pressure differential is created between the hopper and the conduit to thereby induce the flow of the materials from the hopper to the conduit. The pressurized air is cooled via a radiator which transfers heat from the pressurized air to ambient air. Ambient air is caused to flow across the radiator by a fan that is electrically driven by a battery located on the tractor, and that is automatically controlled by a pressure sensor switch positioned for sensing the pressure of the pressurized air stream.

21 Claims, 3 Drawing Sheets

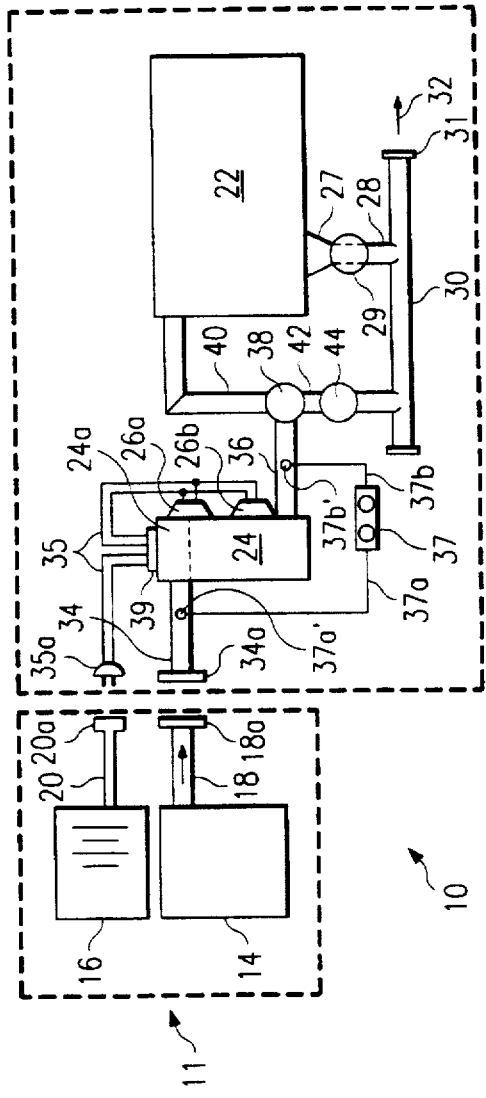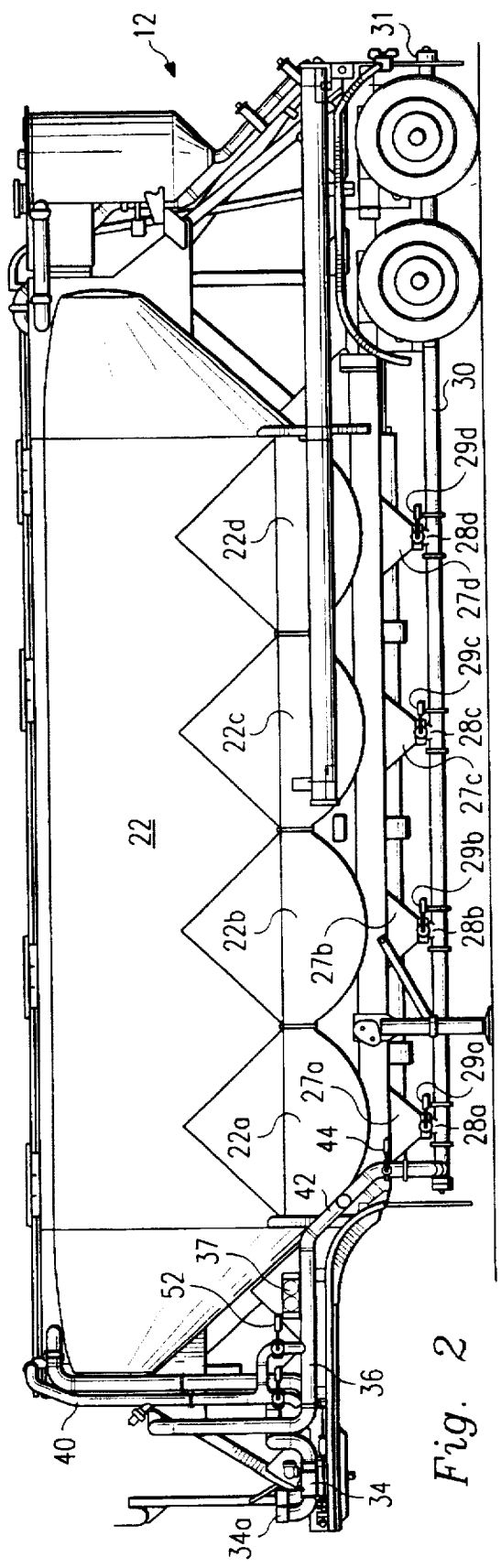

BATTERY-POWERED COOLING SYSTEM FOR TRAILOR PNEUMATIC UNLOADING PROCESS

This application is a continuation-in-part of application Ser. No. 08/534,286, filed Sep. 27, 1995, which issued as U.S. Pat. No. 5,580,193 on Dec. 3, 1996.

TECHNICAL FIELD

The invention relates generally to the unloading of dry bulk materials from a transporter and, more particularly, to a method and system for cooling the air used in a pneumatic unloading process to protect temperature sensitive materials from melting.

BACKGROUND OF THE INVENTION

Many dry bulk materials are conveniently transported by truck. Typically, these trucks consist of a tractor and an attached trailer for carrying the materials. There are various types of trailers, such as a pneumatic tank trailer. Pneumatic tank trailers are often used to transport dry bulk materials like flour, sugar, plastic pellets, or the like, which can be easily stored in a pneumatic tank trailer's hopper.

The conventional method for unloading the dry bulk material from the hopper is a pneumatic unloading process. This process requires the hopper to have an outlet, usually located at the bottom of the hopper, and an inlet, usually located near the top of the hopper. A blower forces an air stream through a top air pipe and into the inlet of the hopper, thereby pressurizing the hopper interior. The blower also forces the air stream through a material conveying conduit, which has an exit port at its downstream end and is connected to the hopper outlet in the middle of the conduit. As the air stream flows through the conduit, a pressure differential occurs between the hopper and the conduit. This differential propels the dry bulk material located in the hopper to move towards the hopper outlet, into the material conveying conduit, and out the exit port.

Although the above-described method works well with many dry bulk materials, it has a drawback when working with temperature sensitive materials such as plastic pellets, sugar, or the like. Because increased pressure is directly proportional to increased temperature, as the pressure in the hopper and the material conveying conduit increases, so does the temperature. The temperature in the hopper and the material conveying conduit often rises above the melting point of the plastic pellets, thereby causing the plastic pellets to melt. Many problems are associated with melting temperature sensitive materials such as plastic pellets. For example, the composition of the pellets breaks down, rendering them useless. Also, the melting plastic can stick to the hopper, the hopper outlet, or the material conveying conduit, requiring lengthy and expensive clean up procedures.

As a result thereof, there are various methods attempting to resolve this problem. One method is to have water-enclosed sheath cool the pipe conveying the air stream to the hopper. This method, however, is not successful because water is not always available at the unloading site and discharge of the water is inconvenient and not environmentally acceptable. Another method is placing cooling fins on the material conveying conduit. This method is also unsuccessful because the fins are expensive, bulky and heavy, and are only marginally effective.

Finally, the most common method is to restrict the blowers to run at a reduced pressure, thereby keeping the temperature below the plastic pellet's melting point. Although this prevents the pellets from melting, it introduces a different set of difficulties. First of all, the pressure must be monitored to insure that it does not get too high, thereby melting the pellets. Secondly, the process now takes a longer time because the lower pressure does not move the pellets as quickly. Thirdly, the pressure differential between the hopper and the material receiving conduit is not as drastic, and therefore the pellets are more likely to get clogged in the hopper outlet.

Therefore, what is needed is a method and system for removing the dry bulk material from the hopper using a pneumatic unloading process, whereby the air temperature is kept below the dry bulk material's melting point and the air pressure is kept significantly high. Furthermore, the method and system should be self-contained on the trailer and not be overly expensive, bulky, or heavy.

SUMMARY OF THE INVENTION

The present invention, accordingly, provides a method and system for unloading dry bulk materials from a tank hopper while keeping the temperature in a cooled state and overcoming or reducing the limitations associated with prior tank cooling systems. A pneumatic process that uses a cooled air stream is used to unload the material from the hopper. In one aspect of the invention, a cooling system, attached to and supported by the trailer facilities, is placed in the air stream. The cooling system includes a heat exchanger to cool the air stream before it enters the hopper and the material conveying conduit. Furthermore, the cooling system is light, inexpensive, relatively compact, and does not require any external power or water source.

In a preferred embodiment, the heat exchanger consists of a radiator and two fans, so that the air stream is forced through the radiator, where it is cooled by the fan, and then forced through the top air pipe and the material conveying conduit. The radiator and fans are attached to the trailer's frame, and the fans are driven by electric power coming from the tractor. A pressure sensor switch is provided for automatically activating and deactivating operation of the fans when the pressure of the air stream exceeds a predetermined pressure.

A technical advantage achieved with the present invention is that it provides cooled air to the dry bulk material in the hopper and the material conveying conduit.

A further technical advantage achieved with the present invention is that activation of the fans for cooling is automatically controlled by the pressure sensor switch, thereby eliminating possible operator failure to activate the fans when necessary.

A further technical advantage achieved with the present invention is that it requires much less maintenance than a system utilizing a pneumatically powered fan.

A further technical advantage achieved with the present invention is that it does not require an external water, air, or electric source to cool the air, but is self-contained by facilities attached to the trailer or already existing on the tractor and trailer.

A further technical advantage achieved with the present invention is that the entire system is light, inexpensive, and does not substantially affect the size of the trailer.

BRIEF DESCRIPTION OF THE DRAWINGS

FIG. 1 is a block diagram of a tank tractor and trailer embodying features of the present invention.

FIG. 2 is a side view of the tank trailer of FIG. 1

DESCRIPTION OF THE PREFERRED EMBODIMENTS

Figure 3:
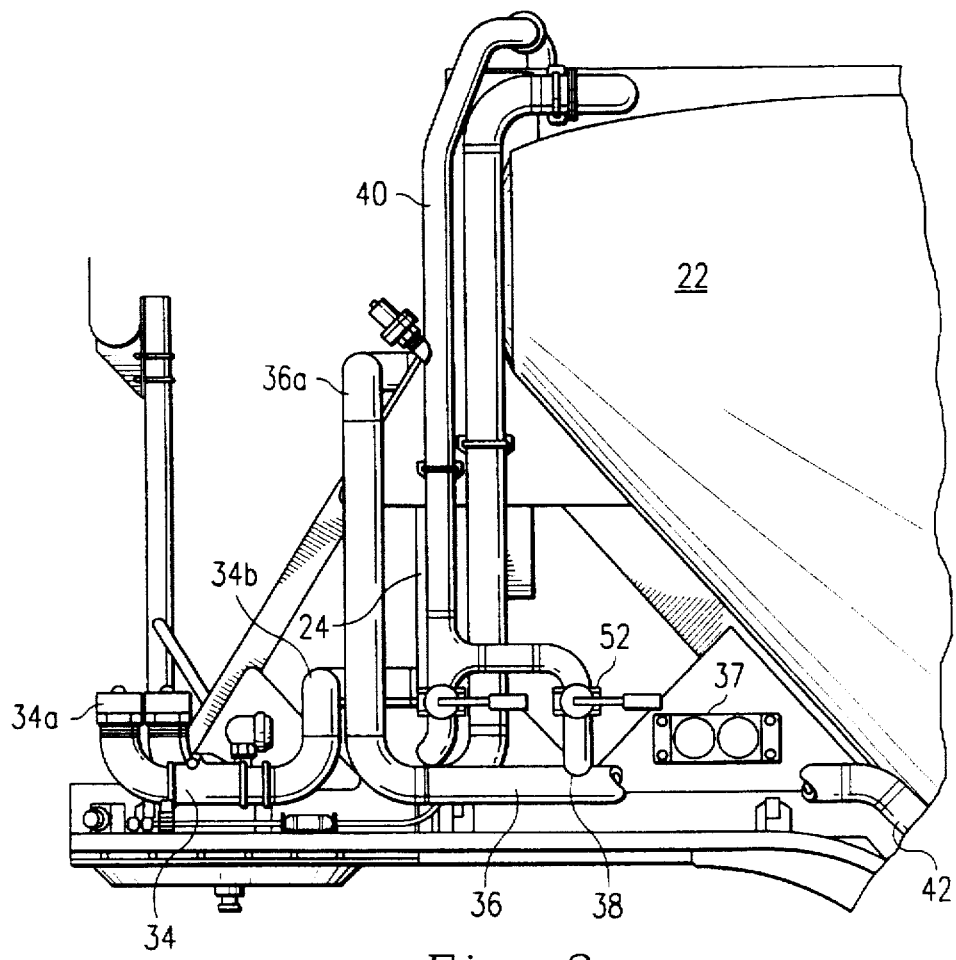
FIG. 3 is an enhanced view of the cooling system of FIGS. 1 and 2.

FIG. 1 depicts a pneumatic unloading system 10, including a tractor 11 and a tank trailer 12. The tractor 11, which is a type well known in the highway transport industry, includes a blower 14 and an electrical power supply, such as a 12 volt DC battery 16. The blower 14 is connected to a blower pipe 18 having a coupling 18a, and the battery 16 is connected via an electrical cable 20 to a conventional 7-way electrical female connector 20a. The blower 14 and battery 16 are thus connectable to the tank trailer 12 through the coupling end 18a and the connector 20a, respectively.

The trailer 12 is in the form of a conventional trailer with a hopper 22, and has been modified to include a heat exchanger, such as a radiator 24 and two fans 26a and 26b, operatively connected in parallel for forcing ambient air through the radiator 24. The fans 26a and 26b may comprise, for example, two, custom manufactured, 12 volt, 8 ampere, 1100 CFM, 16 inch diameter, DC fans, which are available from Ron Davis Racing Products in Phoenix, Ariz., as Part Number 100160PL. Like a conventional tank trailer, the hopper 22 is used to hold various dry bulk materials, such as plastic pellets. The hopper 22 has a lower portion that projects downward to form a hopper outlet 27. The hopper 22 is unloaded by using the hopper outlet 27 to direct the materials out of the hopper 22, through a hopper "T" 28 under the control of a valve 29 disposed in the "T", and thereby into a material conveying conduit 30. The material conveying conduit 30 then directs the materials through a discharge port 31 as shown by an arrow 32, thereby unloading the tank trailer. In the preferred embodiment, there are multiple hoppers, outlets, and hopper "T"s, as discussed in greater detail, below.

The unloading procedure is facilitated with the air stream produced by the blower 14. The blower 14 forces the air stream to the trailer 12 through the blower pipe 18. The trailer 12 includes a receiver pipe 34 having a coupling 34a which is pneumatically connected to blower 14 by couplings 18a. The couplings 18a and 34a are conventional and will therefore not be further discussed. The receiver pipe 34 then directs the air stream into the radiator 24, where the air is cooled.

The radiator 24 utilizes the fans 26a and 26b to draw ambient air from around the trailer and draw it through, or alternatively force it through, the radiator thereby further cooling the air stream. The fans 26a and 26b are electrically driven, i.e., powered, via an electrical cable 35 having a conventional 7-way male electrical connector 35a. The cable 35 is connected to the tractor 11 by connecting the center auxiliary pins (not shown) of the connectors 20a and 35a. In this manner, electrical power may be delivered from the battery 16 to the fans 26a and 26b.

A conventional electropneumatic pressure sensor switch 39 is mounted to a radiator cooling core portion 24a of the radiator 24, though the switch 39 could be mounted to the radiator receiver pipe 34, for sensing the pressure of the air stream coming into the radiator 24. The switch 39 is electrically interconnected with the cable 35 for automatically controlling the flow of electrical power to the fans 26a and 26b so that when the air stream pressure in the receiver pipe 34 exceeds a predetermined pressure, such as 3 psi, the switch 39 closes, thereby enabling electrical power to be delivered through the cable 35 to the fans 26a and 26b, thereby activating the fans 26a and 26b for forcing ambient air through the radiator 24 and cooling the air stream flowing from the receiver pipe 34. Conversely, when the air stream pressure in the receiver pipe 34 falls below the predetermined pressure, such as 3 psi, the switch 39 opens, thereby preventing electrical power from being delivered through the cable 35 to the fans 26a and 26b so that ambient air is not forced through the radiator 24 by the fans.

After passing through the radiator 24, the air stream flows through a cool air pipe 36. A pair of thermometer dial gauges 37 are connected via thermal conductor chords 37a and 37b to respective thermal sensing bulbs 37a' and 37b' mounted to the respective pipes 34 and 36 for measuring the radiator respective inlet and outlet air stream temperatures. The dial gauges 37 have a range of from 50°–300° F. and may, for example, be obtained from H. O. Therice, Part Number 130-T003, Model Number V80041. The thermal conductor chords 37a and 37b and thermal sensing bulbs 37a' and 37b' may, for example, also be obtained from H. O. Therice, Model Numbers MN 4-3D1 and TDG-5, respectively. The inlet and outlet temperatures indicated by the gauges 37 may be used to determine how effectively the radiator 24 is cooling the air stream.

The air stream passes from the cool air pipe 36 through a junction section 38, which splits the air stream between a top air pipe 40 and a lower air pipe 42. The top air pipe 40 directs a portion of the air stream into the hopper 22, thereby pneumatically connecting the hopper 22 to the blower 14. The lower air pipe 42 is attached to the material conveying conduit 30 through a valve 44, thereby pneumatically connecting the material conveying conduit 30 to the blower 14. By forcing a portion of the air stream into the hopper 22, the hopper 22 is thereby pressurized; by forcing a portion of the air stream through the material conveying conduit 30, a pressure differential occurs between the hopper 22 and the material conveying conduit 30. The pressure differential propels the material out of the hopper 22 and into the material conveying conduit 30, where the materials become entrained in and conveyed by the air stream. The air stream then forces the material through the material conveying conduit 30 and out the port 31, as shown by the arrow 32. The air pipes 34, 36, 40, and 42 and the radiator 24 and fans 26a and 26b are discussed in greater detail, below.

Referring to FIG. 2, the receiver pipe 34 directs the air stream from the blower 14 into a bottom section of the radiator 24. As the air stream moves up the radiator, and the pressure sensor switch 39 senses that the pressure of the air stream exceeds a predetermined pressure, such as, 3 psi, then the fans 26a and 26b are automatically activated for cooling the radiator by forcing ambient air through the radiator, thereby cooling the air stream. The air stream then exits an upper section of the radiator 24 through the cool air pipe 36. The air stream is directed through the junction 38, where a portion of the air stream is directed to the material conveying conduit 30 through the lower air pipe 42 and the main control valve 44. The main control valve 44 controls the air stream between the radiator 24 and the material conveying conduit 30. At the junction 38, the remaining portion of the air stream is directed to the top air pipe 40 under the control of a valve 52. Should the pressure sensor switch 39 sense that the pressure of the air stream falls below the predetermined pressure of 3 psi, then the fans 26a and 26b are automatically deactivated.

The hopper 22 of FIG. 2 is shown having a set of four hopper sections, 22a–22d, each attached to a corresponding hopper outlet, 27a–27d, hopper "T"s 28a–28d, and outlet valve 29a–29d, respectively. The hopper "T"s 28a–28d are each connected to the material conveying conduit 30. Each hopper outlet 27a–27d and hopper "T" 28a–28d may be individually controlled by the associated outlet valve 29a–29d, thereby allowing an operator to select and adjust the flow of material from the hopper 22 into the material conveying conduit 30.

Figure 4:
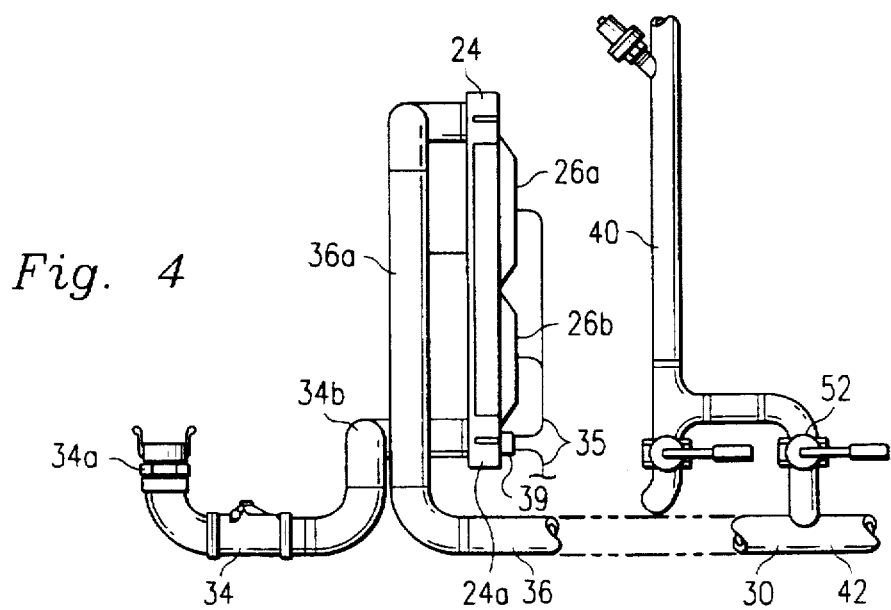
FIG. 4 is a view of a portion of the cooling system of FIG. 3.

The preferred embodiment can also be implemented as a modification kit for a conventional tank trailer, as depicted in FIGS. 3–6. Referring to FIGS. 3 and 4, the kit includes a first pipe 34b, the radiator 24, the fans 26a and 26b, a pressure sensor switch 39, and a second pipe 36a. The first pipe 34b attaches the receiver pipe 34 to the radiator 24. The second pipe 36a attaches the radiator 24 to the cool air pipe 36.

Figure 5:
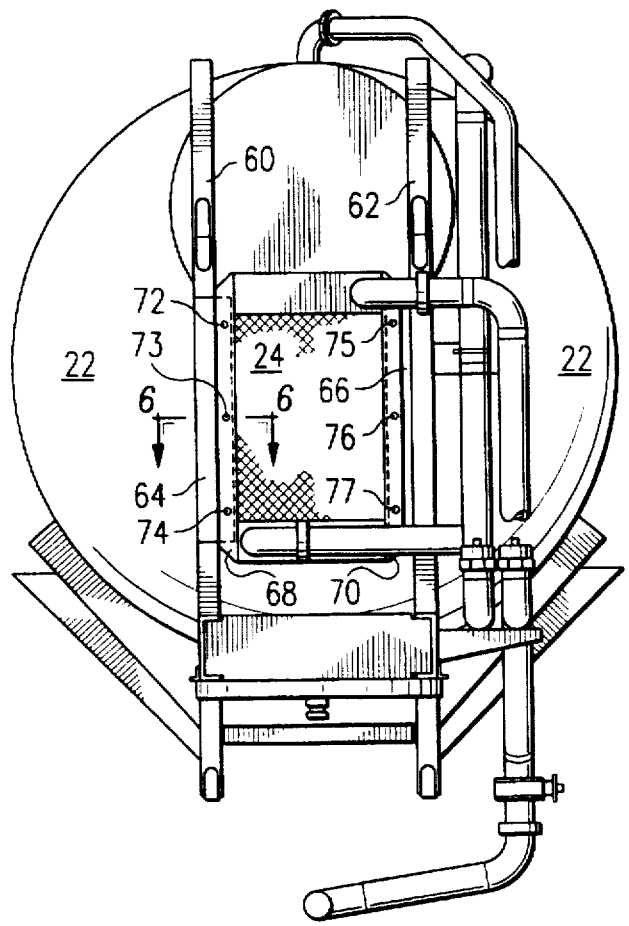
FIG. 5 is an end view of the trailer and cooling system of FIGS. 1–4.
Figure 6:
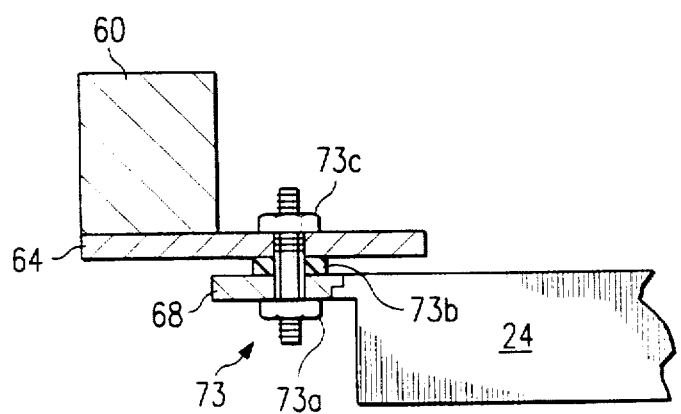
FIG. 6 is an enlarged sectional view taken along line 6—6 of FIG. 5.

The radiator 24 is attached to a conventional tank trailer as shown in FIGS. 5 and 6. The trailer 12 has two frame members, 60 and 62, used to support the hopper 22. Two elongated plate members 64 and 66 are attached to the two frame members 60 and 62, respectively, such that the plate members provide a lip for each frame member as shown in FIG. 6. The radiator 24 includes two flanges, 68 and 70, that run vertically on each side of the radiator 24. The flanges 68 and 70 are sized to overlap the plate members 64 and 66, respectively, so that the radiator 24 can thereby be attached to the frame members 60 and 62 with bolt assemblies 72–77. FIG. 6 shows the bolt assembly 73 which comprises a bolt 73a, a bushing 73b, and a nut 73c. The bolt assemblies 72 and 74–77 are similarly comprised.

Although the various features and principles of the invention will be described in relation to the illustrated tractor and trailer, it will be appreciated by those skilled in the art that one or more features or principles of the invention may be used in other forms of transport and/or handling systems. It is understood that the present invention can take many forms and embodiments without departing from the spirit or the scope of the invention. For example, the tractor 11 and tank trailer 12 may be representative of a first and second section of a singular unit or vehicle used to transport dry bulk material. A temperature sensor switch may be adapted to cooperate with the gauges 37 for sensing when the fans 26a and 26b must be activated to cool the air stream, thereby providing redundancy with, or even obviating the need for, the pressure sensor switch 39. However, because changes in pressure can typically be detected more quickly than changes in temperature, the pressure sensor switch 39 is generally preferred over the temperature sensor switch for activating the fans 26a and 26b. The fans 26a and 26b may be replaced with one or more fans. The system of the invention is also adaptable to railroad transport environments. It is appreciated that alternative mounting arrangements are contemplated according the particular trailer configuration. Furthermore, many non-dry bulk materials will likewise benefit from a pneumatic unloading process with the features and principles of the present invention. Accordingly, it is appropriate that the appended claims be construed broadly and in a manner consistent with the scope of the invention.

What is claimed is:

1. A system for unloading bulk material from a storage device having an outlet for the bulk material, the system comprising:

a material conveying conduit connected to the outlet for receiving the material and conveying the material externally of the device;

means for pressurizing ambient air into pressurized air;

radiator means;

a battery for supplying electrical power;

fan means connectable to and electrically driven by the battery for introducing a cooling fluid comprising air to the radiator means;

means for introducing the pressurized air to the radiator means in a heat exchange relation with the cooling fluid to cool the pressurized air into cooled pressurized air; and means for passing the cooled pressurized air to the conduit to entrain the material as the material passes through the conduit.

2. The system of claim 1 wherein the cooled pressurized air propels the material through the conduit.

3. The system of claim 2 further comprising:

a trailer for supporting the storage device; and a tractor for supporting the battery, the trailer being connectable to the tractor.

4. The system of claim 1 wherein the cooled pressurized air is also introduced into the storage device to create a pressure differential across the device.

5. The system of claim 1 further comprising a pressure sensor switch positioned for sensing a pressure of the pressurized air and connected to the fan means for controlling the electrical power supplied to the fan means so that the fan means is automatically activated when the pressure exceeds a predetermined pressure, and automatically deactivated when the pressure falls below the predetermined pressure.

6. A method of unloading bulk material from a storage device having an outlet for the bulk material, the method comprising the steps of:

passing the material from the device externally of the device;

pressurizing a gas into a pressurized gas;

using an electrically powered fan to move air in a heat exchange relation with the pressurized gas to cool the pressurized gas into a cooled pressurized gas; and introducing the cooled pressurized gas to the material, during the step of passing, to cool the material.

7. The method of claim 6 wherein the step of passing comprises steps of:

discharging the material from the device; and passing the discharged material externally of the device.

8. The method of claim 6 further comprising the step of introducing the cooled pressurized gas to the storage device to create a pressure differential.

9. The method of claim 6 wherein the step of passing further comprises:

passing the material from the device externally of the device into a conduit; and wherein the method further comprises introducing the cooled pressurized gas to propel the material through the conduit.

10. The method of claim 6 further comprising sensing a pressure of the pressurized air and controlling electrical power supplied to the fan so that the fan is automatically activated when the pressure exceeds a predetermined pressure, and automatically deactivated when the pressure falls below the predetermined pressure.

11. A system for unloading bulk material from a transport vehicle comprising:

a hopper for containing the bulk material, the hopper having an outlet;

a material conveying conduit connected to the hopper outlet;

a blower, connected to the material conveying conduit, for feeding a main flow stream of a conveying gas into the material conveying conduit, whereby the bulk material moving from the hopper outlet into the material conveying conduit can become entrained in and conveyed by the main flow stream through the material conveying conduit;

a radiator attached to the transport vehicle and connected between the blower and the material conveying conduit, whereby the main flow stream of conveying gas is cooled before it enters the material conveying conduit;

an electrically powered fan for blowing air through and cooling the radiator, the fan being attached to the transport vehicle;

an electrical power connector; and an electrical power supply connected to the fan via the power connector for supplying the fan with electrical power.

12. The system of claim 11, wherein the hopper further comprises an inlet, the system further comprising a pressurizing conduit connected to the inlet and the radiator whereby a portion of the main flow stream of conveying gas is used to pressurize the hopper.

13. The system of claim 11 wherein the power supply comprises a battery and the power connector comprises an electrical cable.

14. The system of claim 11 wherein the transport vehicle is a tank trailer.

15. The system of claim 11 further comprising a pressure sensor switch positioned for sensing a pressure of the conveying gas and interconnected with the electrical power connector for controlling electrical power supplied to the fan so that the fan is automatically activated when the pressure exceeds a predetermined pressure, and automatically deactivated when the pressure falls below the predetermined pressure.

16. A kit for cooling a transporter pneumatic unloading system, the transporter comprising a hopper for carrying dry bulk material, a material conveying conduit for feeding a conveying gas for transporting the material, and a battery, the kit comprising:

a heat exchanger connectable to the transporter and attached to the material conveying conduit, whereby the heat exchanger removes heat from the conveying gas; and a power supply conductor, connectable to the battery, for supplying electrical power to the heat exchanger.

17. The kit of claim 16, wherein the heat exchanger further comprises a radiator and a fan, the fan being connected to the power supply conductor.

18. The kit of claim 17 wherein the power supply conductor is selectively interchangeable with an electrical cable.

19. The kit of claim 17 further comprising a pressure sensor switch positioned for sensing a pressure of the conveying gas and connected to the fan for controlling the electrical power supplied to the fan so that the fan is automatically activated when the pressure exceeds a predetermined pressure, and automatically deactivated when the pressure falls below the predetermined pressure.

20. A method for unloading dry bulk material from a tank trailer connectable to a truck, the tank trailer comprising a hopper for containing the dry bulk material, a material conveying conduit, and an outlet in the hopper connected to the material conveying conduit, the truck comprising a blower for making a main flow stream of a conveying gas, the method comprising:

feeding the main flow stream of the conveying gas into the material conveying conduit for flow across the hopper outlet, whereby the dry bulk material moving from the hopper outlet into the material conveying conduit can become entrained in and conveyed by the main flow stream; and cooling the main flow stream of conveying gas by using a fan, powered by a battery, to move ambient air through a heat exchange relation with the main flow stream of conveying gas.

21. The method of claim 20 further comprising sensing a pressure of the conveying gas and controlling the fan so that the fan is automatically activated when the pressure exceeds a predetermined pressure, and automatically deactivated when the pressure falls below the predetermined pressure.

* * * * *